United States Patent
Noble et al.

(10) Patent No.: US 7,424,514 B2
(45) Date of Patent: Sep. 9, 2008

(54) PEER-TO-PEER METHOD AND SYSTEM FOR PERFORMING AND MANAGING BACKUPS IN A NETWORK OF NODES

(75) Inventors: Brian D. Noble, Ann Arbor, MI (US); Landon P. Cox, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1138 days.

(21) Appl. No.: 10/697,842

(22) Filed: Oct. 30, 2003

(65) Prior Publication Data

US 2004/0153458 A1 Aug. 5, 2004

Related U.S. Application Data

(60) Provisional application No. 60/424,831, filed on Nov. 8, 2002.

(51) Int. Cl.
G06F 15/16 (2006.01)
G06F 15/173 (2006.01)

(52) U.S. Cl. ............... 709/205; 709/218; 709/224; 709/226; 709/249

(58) Field of Classification Search ........... 709/202, 709/203, 205, 224, 226, 249, 251
See application file for complete search history.

(56) References Cited

U.S. PATENT DOCUMENTS 6,973,595 B2 * 12/2005 Kaminsky et al. ........... 709/224
7,177,951 B1 * 2/2007 Dykeman et al. ........... 709/249
7,206,934 B2 * 4/2007 Pabla et al. ................. 709/226
7,213,047 B2 * 5/2007 Yeager et al. ............... 709/202
7,231,463 B2 * 6/2007 Nagendra et al. ........... 709/251
7,254,608 B2 * 8/2007 Yeager et al. ............... 709/203
7,328,243 B2 * 2/2008 Yeager et al. ............... 709/205

OTHER PUBLICATIONS

Stoica, Ion, et al., Chord: A Scalable Peer-to-Peer Lookup Service For Internet Applications, Proceedings of the ACM SIGCOMM 2001 Conference, San Diego, California, Aug. 2001, pp. 149-160.*

Clark, Ian, et al., Protecting Free Expression Online With Freenet, IEEE Internet Computing, 6(1), Jan.-Feb. 2002, pp. 40-49.*

Rowstron, et al., Pastry: Scalable, Decentralized Object Location And Routing For Large-Scale Peer-to-Peer Systems, IFIP/ACM International Conference on Distributed Systems Platforms, Heidelberg, Germany, Nov. 2001, pp. 329-350.*

(Continued)

Primary Examiner—Quang N. Nguyen
(74) Attorney, Agent, or Firm—Brooks Kushman P.C.

(57) ABSTRACT

A peer-to-peer method and system for performing and managing backups in a network of nodes exploit excess disk capacity to perform peer-to-peer backup with no administrative costs. Each node minimizes storage overhead by selecting peer nodes that share substantial amounts of data. Common installations find suitable peer nodes and peer nodes with high overlap are identified. The method and system also provide mechanisms for confidentiality, integrity, and detection of failed or malicious peer nodes.

32 Claims, 2 Drawing Sheets

OTHER PUBLICATIONS

Rhea, Sean, et al., Maintenance-Free Global Data Storage, IEEE Internet Computing, Sep. 2001, 5(5), pp. 40-49.*

Batten, Christopher, et al., pStore: A Secure Peer-to-Peer Backup System, MIT Laboratory for Computer Science, Dec. 2001.*

Elnikety, Sameh, et al., Peer-to-Peer Cooperative Backup System, The USENIX Conference on File and Storage Technologies, Monterey, California, Jan. 2002, pp. 1-5.*

Bolosky, William J., et al., Single Instance Storage In Windows 2000, Proceedings of the 4th USENIX Windows Systems Symposium, Aug. 2000, Seattle, Washington, pp. 13-24.*

Quinlan, Sean, et al., Venti: A New Approach to Archival Storage, Proceedings of the USENIX Conference on File and Storage Technologies, Jan. 2002, Monterey, California, pp. 89-102.*

Muthitacharoen, Athicha, et al., A Low-Bandwidth Network File System, Proceedings of the 18th ACM Symposium on Operating Systems Principles, Banff, Canada, Oct. 2001, pp. 174-187.*

Bolosky, William J., et al., Feasibility of a Serverless Distributed File System Deployed on an Existing Set of Desktop PCs, Proceedings of the International Conference on Measurement and Modeling of Computer Systems, Santa Clara, California, Jun. 2000, pp. 34-43.*

* cited by examiner

PEER-TO-PEER METHOD AND SYSTEM FOR PERFORMING AND MANAGING BACKUPS IN A NETWORK OF NODES

CROSS-REFERENCE TO RELATED APPLICATIONS

This application claims the benefit of U.S. Provisional Patent Application Ser. No. 60/424,831, filed Nov. 8, 2002.

BACKGROUND OF THE INVENTION

1. Field of the Invention

This invention relates to a peer-to-peer methods and systems for performing and managing backups in a network of nodes.

2. Background Art

Backup is cumbersome and expensive in time and equipment. Machines are backed up rarely, if at all. Most users believe that backup is more trouble than it is worth. Internet backup services exist, but are costly. For example, Connected TLM offers individual users backup of up to 4 GB—but covers neither applications nor the operating system—for $15 per month. Machines within an organization can be backed up centrally, but at significant cost. For example, the computer support arm of the University of Michigan's College of Engineering provides backup service for up to 8 GB on a single machine for $30 per month.

Such cost and inconvenience are unavoidable. Small-scale solutions require significant administrative efforts. Large-scale solutions require aggregation of substantial demand to justify the capital costs of a large, centralized repository.

There is increasing recognition that disks better serve the needs of near-line archival storage. The purchasing cost of disk subsystems has caught up with tape, and disks provide better access and restore time. At the same time, the conventional wisdom that data expands to fill storage is proving to be untrue. Furthermore, the amount of newly written data per client per day is a small fraction of the total file system. Several systems take advantage of low write traffic in the presence of excess storage capacity.

Backup is critical to fault tolerance and recovery in practical systems, yet there is a surprisingly small amount of literature on the topic. Current commercial systems focus on large, centrally-managed repositories.

Several projects have suggested the use of peer-to-peer routing and object storage systems as a substrate for backup, including Chord, Freenet, and Pastry, as described in the following respective articles:

I. Stoica, R. Morris, D. Karger, M. F. Kaashoek, and H. Balakrishnan, "Chord: A Scalable Peer-to-Peer Lookup Service for Internet Applications," in *Proceedings of the ACM SIGCOMM 2001 Conference*, pages. 149-160, San Diego, Calif., August 2001;

I. Clarke, S. G. Miller, T. W. Hong, O. Sandberg, and B. Wiley, "Protecting Fee Expression Online with Freenet," *IEEE Internet Computing*, 6(1):40-49, 2002; and A. Rowstron and P. Druschel, "Pastry: Scalable, Distributed Object Location and Routing for Large-Scale Peer-to-Peer Systems," in *IFIP/ACM International Conference on Distributed Systems Platforms*, pages 329-350, Heidelberg, Germany, November 2001.

File systems built on them provide protection against machine failure. However, they do not protect against human error, nor do they provide the ability to retrieve prior versions of files once replaced. OceanStore, a global storage utility, does provide these benefits, but the decision of which versions to retire rests with the utility, not its clients, as described in S. Rhea, C. Wells, P. Eaton, D. Geels, B. Zhao, H. Weatherspoon, and J. Kubiatowicz, "Maintenance-Free Global Data Storage," *IEEE Internet Computing*, 5(5):40-49, September 2001.

The pStore cooperative backup system, built on top of Chord, uses a variant of a fine-grained scheme, as described in C. Batten, K. Barr, A. Saraf, and S. Trepetin, "pStore: A Secure Peer-to-Peer Backup System," unpublished report, MIT Laboratory for Computer Science, December 2001. However, it does not exploit inter-host sharing, nor does it address the problem of hosts falsely claiming to store data.

A cooperative backup scheme that requests random blocks from partners, but assumes that partners either drop all or none of the archived state is described in S. Elnikety, M. Lillibridge,. M. Burrows, and W. Zwaenepoel, "Cooperative Backup System," in *The USEINIX Conference on File and Storage Technologies*, Monterey, Calif., January 2002, work-in-progress report.

A number of systems exploit duplicate data across files and machines to minimize the costs of archival storage. The Single Instance Store detects and coalesces duplicate files, while Venti divides files into fixed-size blocks and hashes those to find duplicate data, as described in W. J. Bolosky, S. Corbin, D. Goebel, and J. R. Douceur, "Single Instance Storage in Windows 2000," in *Proceedings of the* 4th *USENIX Windows Systems Symposium*, pages 13-24, Seattle, Wash., August 2000, and S. Quinlan and S. Dorward, "Venti: A New Approach to Archival Storage," in *Proceedings of the USENIX Conference on File and Storage Technologies*, pages 89-102, Monterey, Calif., January 2002, respectively. Neither of these approaches can take advantage of small edits that move data within a file, as content-based indexing does. Other sophisticated techniques for detecting such changes exist, but must be run on pairs of files that are assumed to have overlap.

Rather than exploit redundancy, one can instead turn to the use of erasure codes to stripe data across several replicas. Such codes allow for low-overhead replication, and are tolerant of the failure of one or more replicas. Their main shortcoming is that they require the participation of more than one node for restore.

A snapshot primitive may be exposed for a variety of purposes, including backup. Typically, snapshots are used to stage data to archival media other than disk. A snapshot mechanism may be leveraged to provide fine-grained, remote disk mirroring with low overhead.

Pastry, a peer-to-peer network, provides scalable, self-administered routing and node location. As previously described, content-based indexing provides flexible discovery of redundant data, as described in A. Muthitacharoen, B. Chen, and D. Maziéres, "A Low-Bandwidth Network File System," in *Proceedings of the* 18th *ACM Symposium on Operating Systems Principles*, pages 174-187, Banff, Canada, October 2001.

Convergent encryption allows two hosts to share the same physical storage of a common block in the presence of separate encryption keys, as described in W. J. Bolosky, J. R. Douceur, D. Ely, and M. Theimer, "Feasibility of a Serverless Distributed File System Deployed on an Existing Set of Desktop PCs," in *Proceedings of the International Conference on Measurement and Modeling of Computer Systems*, pages 34-43, Santa Clara, Calif., June 2000.

SUMMARY OF THE INVENTION

An object of the present invention is to provide a peer-to-peer method and system for performing and managing backups in a network of nodes in an easy and relatively inexpensive fashion.

In carrying out the above object and other objects of the present invention, a peer-to-peer method for performing and managing backups in a network of nodes which form a cooperative collection of machines having excess storage capacity is provided. The method includes: (a) determining a plurality of peer nodes from the network of nodes for a first node of the network based on an amount of stored data common to both the first node and each of the plurality of peer nodes, and (b) storing a backup copy of data unique to the first node on each of the plurality of peer nodes so that each of the plurality of peer nodes stores a substantially complete backup of the first node.

The method may further include repeating steps (a) and (b) above for each of the other nodes of the network so that a plurality of substantially complete backups are stored on a plurality of peer nodes for each of the nodes of the network.

The step of determining may be based on network distance that each of the plurality of peer nodes is from the first node.

At least one of the plurality of peer nodes may be a local peer node to reduce network load and improve restore performance.

At least one of the plurality of peer nodes may be a remote peer node to provide geographic diversity.

Data may be stored in the first and peer nodes as chunks of data.

The method may further include monitoring the plurality of peer nodes to determine if a peer node is no longer capable of providing a backup to the first node and repeating steps (a) and (b) to determine a replacement peer node from the network of nodes and to store a backup copy of data unique to the first node on the replacement peer node.

The step of monitoring may be performed statistically.

The method may further include preventing a forged request to drop a backup copy from one of the peer nodes.

The data may be stored in the peer nodes as encrypted chunks.

The data may be encrypted by a key derived from the data stored in the peer nodes. The key may be encrypted. The key may be encrypted by a key-encrypting key stored with the data.

The data may be stored in the peer nodes as chunks of encrypted data wherein each of the encrypted chunks includes data which represents a set of nodes having an interest in the encrypted chunk.

The method may further include determining when the first node is decommissioned and reclaiming storage space on the peer nodes associated with the decommissioned node.

The method may further include determining whether a node of the network claiming to be a peer node is a peer node.

Further in carrying out the above object and other objects of the present invention, a peer-to-peer system for performing and managing backups in a network of nodes which form a cooperative collection of machines having excess storage capacity is provided. The system includes means for determining a plurality of peer nodes from the network of nodes for a first node of the network based on an amount of stored data common to both the first node and each of the plurality of peer nodes. The system further includes means for storing a backup copy of data unique to the first node on each of the plurality of peer nodes so that each of the plurality of peer nodes stores a substantially complete backup of the first node.

The means for determining may determine a plurality of peer nodes from the network for each of the nodes of the network and the means for storing may store a backup copy of data unique to each of the nodes of the network on each of its plurality of peer nodes so that a plurality of substantially complete backups are stored on a plurality of peer nodes for each of the nodes of the network.

The means for determining may determine the plurality of peer nodes based on network distance that each of the plurality of peer nodes is from the first node.

The method may further include means for monitoring the plurality of peer nodes to determine if a peer node is no longer capable of providing a backup to the first node, wherein the means for determining determines a replacement peer node from the network of nodes and wherein the means for storing stores a backup copy of data unique to the first node on the replacement peer node.

The means for monitoring may monitor the plurality of peer nodes statistically.

The system may further include means for preventing a forged request to drop a backup copy from one of the peer nodes.

The system may further include means for determining when the first node is decommissioned and means for reclaiming storage space on the peer nodes associated with the decommissioned node.

The system may further include means for determining whether a node of the network claiming to be a peer node is a peer node.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
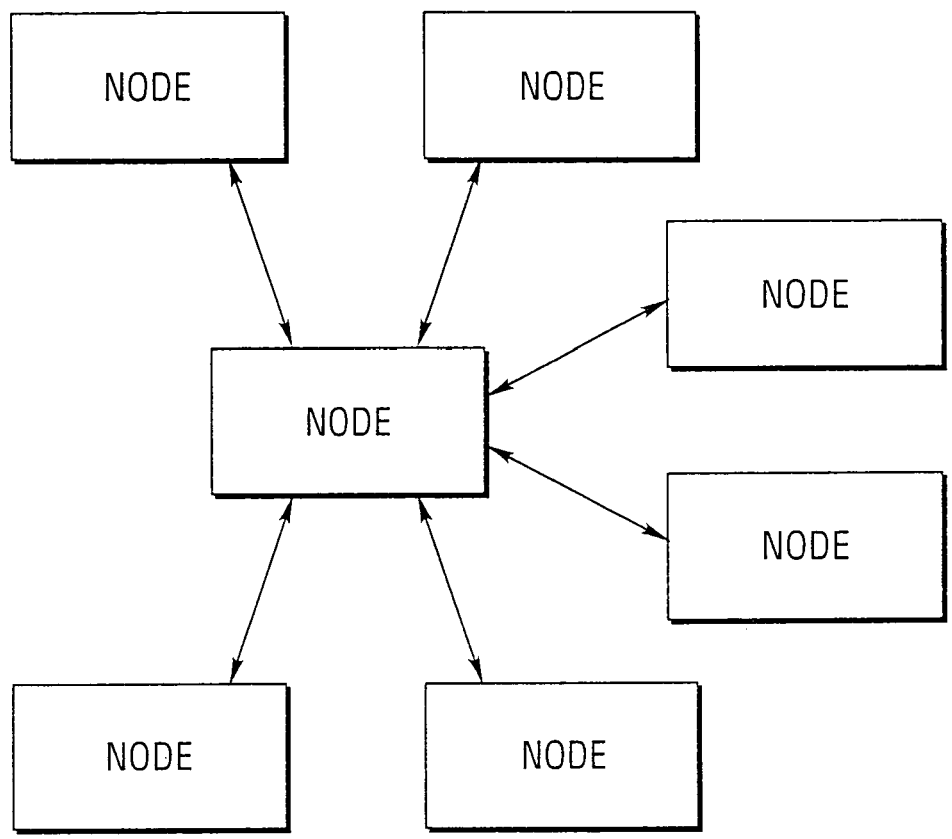
FIG. 1 is a schematic block diagram of a network of nodes or machines such as computers to which the present invention is applicable.

By way of introduction, the method and system of the present invention typically uses excess disk capacity within a network of machines or nodes such as computers for efficient, effective, and administration-free backup, as shown in FIG. 1. The nodes form a cooperative collection of machines that provide mutual backup services. Because individual machines may come and go, each node replicates its archival data on more than one peer. Most of these replicas are placed nearby to ease network overhead and minimize restore time, though at least one replica should be elsewhere to guard against catastrophe.

Much of the data on a given machine is not unique, and is generated at install time. For most machines, common data will be shared widely. For example, the default installation of Office 2000 Professional requires 217 MB; it is nearly ubiquitous and different installations are largely the same. Randomly grouping disparate file systems and coalescing duplicate files products substantial savings. The present invention identifies systems with substantial overlap to increase this savings.

The data of the present invention is stored in a chunkstore file system, enabling sharing of common data without undue performance penalties. An individual node preferably uses two Pastry overlays to find backup buddies or peers that have substantial data in common and have desirable locations. When a backup snapshot is taken, the node ships only unique data to its buddies. The present invention also prevents forged requests to drop snapshots, but buddies are free to drop them in the event of a local space crisis. The invention typically employs probabilistic mechanisms to detect unfaithful buddies and to reclaim backup space belonging to decommissioned nodes.

An evaluation of a prototype of the invention shows that it induces a low percentage overhead on a modified Andrew Benchmark, despite storing files in chunks. An examination of file system data shows that tens of chunks can discriminate between backup buddies with good and poor overlap. Simulations show that nodes of the present invention with common installations can easily find desirable buddies. Analytical results show that such a node can detect corrupted backup state with high probability by checking a very low percentage of all chunks.

Enabling Technologies

One embodiment of the present invention preferably depends on three enabling technologies. The first is Pastry, a scalable, self-organizing, peer-to-peer routing and object location infrastructure. The second is content-based indexing, a technique that finds common data across different files. The third is convergent encryption, which enables sharing without compromising privacy. The three technologies are described in the articles noted above.

Peer-to-Peer Routing

The present invention eschews the use of a centralized authority to manage backup sites. Such an authority would act as a single point of control, limiting scalability and increasing expense. Instead, one embodiment of the present invention relies on Pastry, a scalable, self-organizing, routing and object location infrastructure for peer-to-peer applications.

Each Pastry node is given a nodeId; the set of all nodeId's are expected to be uniformly distributed in the nodeId space. Any two Pastry nodes have some way of measuring their proximity to one another. Typically, this metric captures some notion of network costs.

Each node N maintains three sets of state: a leaf set, a neighborhood set, and a routing table. The leaf set consists of L nodes; L/2 are those with the closest but numerically smaller nodeIds, and L/2 are the closest but larger ones. The neighborhood set of M-nodes contains those closest to N according to the proximity metric.

The routing table supports prefix routing. There is one row per digit in the nodeId space.

Pastry nodeIds are not necessarily decimal numbers; the base used is a configuration parameter of the Pastry network. Pastry's recommendation is followed and hexadecimal digits are used.

The first row contains a list of nodes whose nodeIds differ from this one's in the first digit; there is one entry for each possible digit value. The second row holds a list of nodes whose first digit is the same as this one's, but whose second digit differs. To route to an arbitrary destination, a packet is forwarded to the node with a matching prefix that is at least one digit longer than that of the current node. If such a node is not known, the packet is forwarded to a node with an identical prefix, but that is numerically closer to the designation in nodeId space. This process proceeds until the destination node appears in the leaf set, after which it is delivered directly. The expected number of routing steps is log N, where N is the number of nodes.

Many positions in the routing table can be satisfied by more than one node. When given a choice, Pastry records the closest node according to the proximity metric. As a result, the nodes in a routing table sharing a shorter prefix will tend to be nearby because there are many such nodes. However, any particular node is likely to be far away.

Pastry is self-organizing; nodes can come and go at will. To maintain Pastry's locality properties, a new node must join with one that is nearby according to the proximity metric. Pastry provides a seed discovery protocol that finds such a node given an arbitrary starting point.

Content-Based Indexing

To minimize storage overhead, the present invention finds redundant data across versions of files, files in a system, and files on distinct machines. Rsync and Tivoli employ schemes for finding common subsets in two versions of (presumably) the same file. However, these techniques cannot easily capture general sharing. In contrast, LBFS uses content-based indexing to find common data in arbitrary files efficiently.

The challenge is to find sharing—and hence structure— across seemingly unrelated files without knowing the underlying structure. Content-based indexing accomplishes this by identifying boundary regions, called breakpoints, using Rabin fingerprints. A fingerprint is computed for each overlapping 48-byte substring in a file. If the low-order bits of a fingerprint match a predetermined value, that offset is marked as a boundary. Boundaries divide files into chunks. Since boundaries are purely content-driven, editing operations change only the chunks they touch, even if they change offsets.

Each chunk is named by taking a SHA-1 hash of its contents. The probability that two different chunks will hash to the same value is much lower than the probability of hardware errors. It is therefore customary to assume that chunks that hash to the same value are in fact the same chunk, and the present invention adopts this custom.

Sharing With Confidentiality

A well-chosen backup buddy already has much of a node's data, even before the first backup. However, the present invention should guarantee the confidentiality and integrity of its participants' data. If clients are free to choose their own cryptographic keys, chunks with identical content will be represented differently, precluding sharing.

The Farsite file system solves this problem with convergent encryption. Under convergent encryption, each file is encrypted by a key derived from the file's contents. Farsite then encrypts the file key with a key-encrypting key, known only to the client; this key is stored with the file. As a file is shared by more clients, it gains new encrypted keys; each client shares the single encrypted file.

If a node backs up a new chunk not already stored on a backup buddy, the buddy cannot discover its contents after shipment. However, if the buddy has that chunk, it knows that the node also stores that data. The invention allows this small information leak in exchange for increased storage efficiency.

Design

The data of the present invention is stored on disk as encrypted chunks. Chunks carry owner lists, which name the set of owners with an interest in this chunk. Chunks may be stored on a node's disk for the node itself, a backup client, or both. Chunks are immutable, and each chunk persists until no node holds a reference to it. The invention ensures that only rightful owners are capable of removing a reference to (and possibly deleting) a chunk.

Figure 2:
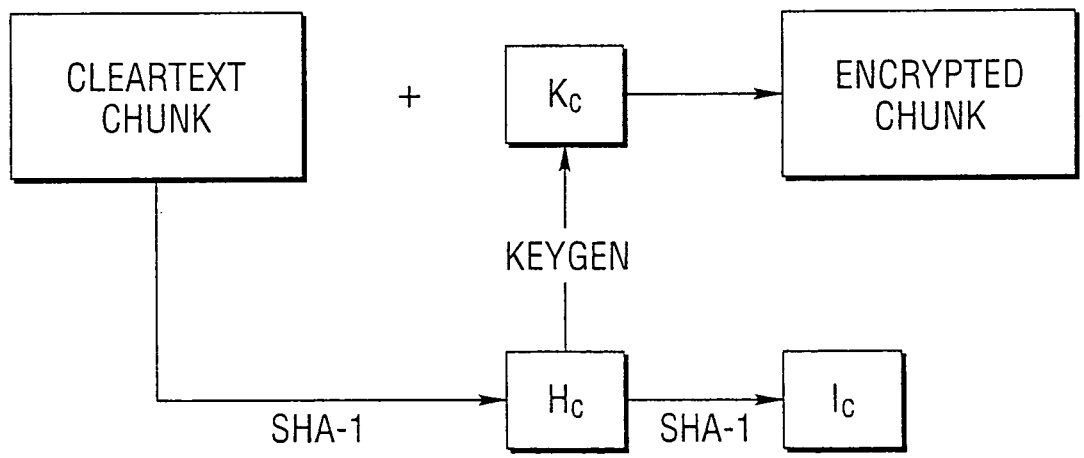
FIG. 2 is a schematic block diagram which illustrates how chunks are stored and named; a cleartext chunk is hashed, producing its handle; the handle is used for key generation, and hashed again to produce the chunkId; the chunk is stored encrypted by the key and named by the chunkId.

When a newly written file is closed, its data is indexed to discover its chunk boundaries. Each chunk.c is hashed; the result is called the chunk's handle, $H_c$. Each handle is used to generate a symmetric encryption key, $K_c$, for its chunk. The handle is hashed again to determine the public chunkId, $I_c$, of the chunk. Each chunk is stored on disk encrypted by $K_c$ and named by its chunkId. This process is illustrated in FIG. 2.

After creating the list of chunkIds representing a new file, the invention checks to see if any of those chunks already exist. If so, the local host is added to the owner list if necessary, and the local reference count is incremented. Otherwise, the chunk is encrypted, a message authentication code is appended, and the chunk is written out to disk, with a reference count of one for the local owner. This process is deferred to avoid needless overhead for files with short lifetimes, at the cost of slightly weaker persistence guarantees. The list of chunkIds that describes a node's current file system is called its signature.

Data chunks are immutable. When a file is overwritten, its set of constituent chunks may change. Any chunks no longer part of the file have their local owner's reference count decremented; if the reference count drops to zero, the local owner is removed. If the owner list becomes empty, the chunk's storage is reclaimed. File deletion is handled similarly.

The meta-data for a file contains the list of handles for the chunks comprising that file, plus the usual contents: ownership, permissions, creation and modification times, etc. The handles in this list are used to derive the decryption key and chunkId for each constituent chunk. Meta-data objects are encrypted to protect the handle values and hence cryptographic keys. Meta-data objects include the nodeId of the node on which they were created plus a sequence number, ensuring that logically distinct meta-data objects will not hash to the same value.

Unlike data, meta-data is not chunked and it is mutable. The present invention does not chunk meta-data because it is typically small and unlikely to be widely shared. Meta-data is mutable to avoid cascading writes. Each write to a file changes its constituent chunkIds. If meta-data were immutable, the present invention would have to create a new meta-data object for this file with a new name. This new name would have to be added to the enclosing directory, which would also change, and so on to the file system root. Instead, the $H_c$, $K_c$, and $I_c$ for a file's meta-data are computed only at file creation time, and are re-used thereafter.

The meta-data object corresponding to a file system root is treated specially: its $H_c$ is generated by a host-specific passphrase. As explained hereinbelow, this passphrase plus the machine's name is all that is required to restore a machine from scratch.

Chunks that are part of some node's backup state include that host in their owner list. Remote hosts supply a public key with their backup storage requests. Requests to remove references must be signed by the corresponding secret key, otherwise those requests are rejected.

Fingerprints: Finding Redundancy

Much of the long-lived data on a machine is written once and then never overwritten. Observations of file type and volume ownership suggest that the amount of data written thereafter will be small. In other words, the signature of a node is not likely to change much over time. Therefore, if all data had to be shipped to a backup site, the initial backup of a freshly installed machine would likely be the most expensive.

An ideal backup buddy for a newly-installed node is one that holds a superset of the new machine's data; machines with more complete coverage are preferred to those with less. One simple way to find such nodes is to ship the full signature of the new node to candidate buddies, and have them report degree of overlap.

Unfortunately, signatures are large: 20 bytes per chunk. Since expected chunk size is 16 KB, signatures are expected to cost about 1.3 MB per GB of stored data. If this cost were paid only once, it might be acceptable. However, a node's buddy set can change over time as buddies are found to be unreliable or as the degree of overlap changes.

Rather than send a full signature, nodes of the present invention typically send a small, random subset of their signatures called a fingerprint. This is motivated by the following observation. Most data on disk belongs to files that are part of a much larger logical entity. For example, a Linux hacker with the kernel source tree has largely the same source tree as others working on the same version. Any machine holding even a small number of random chunks in common with this source tree is likely to hold many of them. Preliminary experiments show that tens of chunkIds are enough to distinguish good matches from bad ones.

Overlays: Finding a Set of

All of a node's buddies or peers should have substantial overlap with that node to reduce storage overhead. In addition, most buddies should be nearby to reduce global network load and improve restore performance. However, at least one buddy should be located elsewhere to provide geographic diversity. The present invention uses two Pastry overlays to facilitate buddy discovery. One is organized by network proximity, the other by file system overlap.

Every node of the present invention typically joins a Pastry overlay organized by network distance. Its nodeId is a hash of the machine's fully-qualified domain name. Once it has joined, the new node picks a random nodeId and routes a discovery request to that node. The discovery request contains the new node's fingerprint. Each node encountered on the route computes its coverage, the fraction of chunks in the fingerprint stored locally, and returns it.

Due to Pastry's route maintenance mechanisms, a probe is expected to generate log N potential candidates. The first candidates encountered are likely to be nearby, while the last few discovered are likely to be far away. If the initial probe does not generate a sufficient candidate set, the probe process is repeated. Subsequent probes are not generated by random nodeId selection. Instead, these probes vary the first digit of the original nodeId. Since Pastry uses prefix routing, each subsequent probe will generate sets of candidates disjoint from those already examined. This rotating probe is called a "lighthouse sweep."

Nodes with common installations should easily find others with high coverage rates and can choose among them to generate a balance between local and remote nodes. Rare installations will have more difficulty. Nodes that do not find an adequate set during a lighthouse sweep join a second overlay, called the coverage-rate overlay. This overlay uses fingerprint coverage rather than network hops as the distance metric.

When a node joins the coverage-rate overlay, a seed discovery algorithm finds a candidate node with good overlap. The new node then chooses backup buddies from its Pastry neighbor set. Recall that the neighbor set of a node consists of the M nodes closest to this node according to the distance metric. Since these nodes are chosen for their degree of fingerprint coverage, they will have the best overlap available. On the other hand, the nodes are not likely to be near the newly joined one.

The use of coverage rate as a distance metric has interesting applications for Pastry. Like network distance, coverage rate does not obey the triangle inequality. However, the present invention typically only considers nodes in the neighbor set, restricting searches to single hops. Unlike network distance, coverage rate is not symmetric; if A holds all of B's files, the converse is probably not true. This means that an individual node must build its routing state based on the correct perspective. Likewise, the seeding algorithm should be supplied with the new node's fingerprint, so that it can compute coverage from the correct point of view.

It is possible for a malicious node to habitually under- or over-report its coverage. If it under-reports, it can avoid being selected as a buddy. If it over-reports, it can attract unsuspecting clients only to discard their backup state. Unfortunately, this is possible no matter who computes coverage rates. An honest node can be given a random list of chunkIds as a fingerprint; such a fingerprint is unlikely to match anything. Likewise, a malicious node can cache and report fingerprints sent by others with commonly-appearing chunkIds, hoping for a false match.

Backup Protocol

A node of the present invention typically has full control over what, when, and how often to back up. Each discrete backup event is viewed snapshot. Nodes can subscribe to a calendar-based cycle, a landmark-based scheme, or any other schedule. Because a machine is responsible for its own archival plan, it also keeps a meta-data skeleton for each retained snapshot. A file that is not part of the local machine's current file system but is part of one or more archived snapshot has a corresponding meta-data entry stored on the local machine. The skeleton for all retained snapshots is stored as a collection of per-file logs, similar to WAFL's snapshot mechanism.

The state necessary to establish a new snapshot consists of three things: the chunks to be added to the backup store, the list of chunks to be removed, and the meta-data objects that change in the skeleton as a result. These are called the add set, delete set, and meta-data list.

The snapshot process begins by shipping the host's public key. This key will be associated with any new chunks to validate later requests to delete or replace them. The snapshot node then forwards the chunkIds for elements of the add set. If any of those chunks are not already stored on the buddy, the buddy fetches the chunks from the node.

Next, the node sends the delete list. The snapshot host adds a chunkId to the delete list only if it does not belong to any snapshot the client wishes to retain. The delete list should be signed, and this signature is checked to ensure it matches the public key associated with any chunks scheduled for deletion. Deletion is not effected immediately. It is deferred to the end of the snapshot process.

Finally, the snapshot node sends any changed meta-data chunks. Since they may overwrite old meta-data chunks, their chunkIds must also be signed. When all state has been transferred, the checkpoint host requests a commit of the checkpoint. Before responding, the buddy should ensure that all added chunks, changed meta-data objects, and deleted chunkIds are stored persistently. Once that is complete, the buddy can respond, and later apply the new snapshot by performing deletions and overwrites.

The performance of snapshots is not crucial, since they are largely asynchronous. The only exception is marking the chunkstore copy-on-write, which should be done synchronously. However, as with AFS's volume clone operation, this is inexpensive. The load induced on a buddy by the backup protocol can be regulated explicitly with resource containers or implicitly with progress-based mechanisms.

If either party fails during the snapshot process, it can be restarted. The most expensive phase—shipping new data chunks—makes progress even in the presence of failures, since new chunks are stored as they arrive. After the new snapshot is applied, a faithful buddy will have a complete copy of the meta-data skeleton, plus all data chunks the skeleton names.

Restoration

A node of the present invention typically retains its archive skeleton, so performing partial restores is straightforward. The node identifies which chunks correspond to the restore request, and obtains them from the nearest of its buddies.

Recovering from disaster requires a way to boot-strap the skeleton. To do so, a node of the present invention keeps a copy of its root meta-data object on each member of its network-distance leaf set. When a machine recovers from disaster, it rejoins the distance-based overlay with the same nodeId, which is computed from its host name. It then obtains its root node from one of its leaves, and decrypts it with the key generated from the host's passphrase. Since the root block contains the set of buddies in effect when it was replicated, the node can recover all other state.

Failure, Malice, and Greed

A buddy is expected to retain backup snapshots, but is not absolutely required to do so. When faced with a sudden disk space crisis or a widespread OS and application upgrade, a buddy is free to reclaim space. Furthermore, a buddy may fail or be connected intermittently, leaving its ability to serve future restore requests in doubt. Finally, a malicious buddy may claim to store chunks without actually doing so.

The present invention preferably employs a probabilistic mechanism to detect all of these situations. Each node periodically asks buddies for a random subset of chunks from the node's archive. By requesting a modest number of chunks, clients can bound the probability that compromised backup state goes undetected. Savvy users of traditional backup schemes already employ this technique as an end-to-end confirmation of correctness.

This technique assumes that malicious hosts cannot directly collude. This is reasonable, since only the host knows who its buddies are. However, a malicious party can register a large number of nodes in the nodeId space to increase its chances of serving as more than one replica. Defending against such Sybil attacks in practice requires some centralized agency to certify identities.

If a buddy cannot produce data it claims to hold, the client removes it from its buddy list. If a buddy has not responded for a significant period of time, the client likewise removes it. When a node loses a buddy, it searches for a new one, as previously described and instantiates a replica of its archive there.

Figure 3:
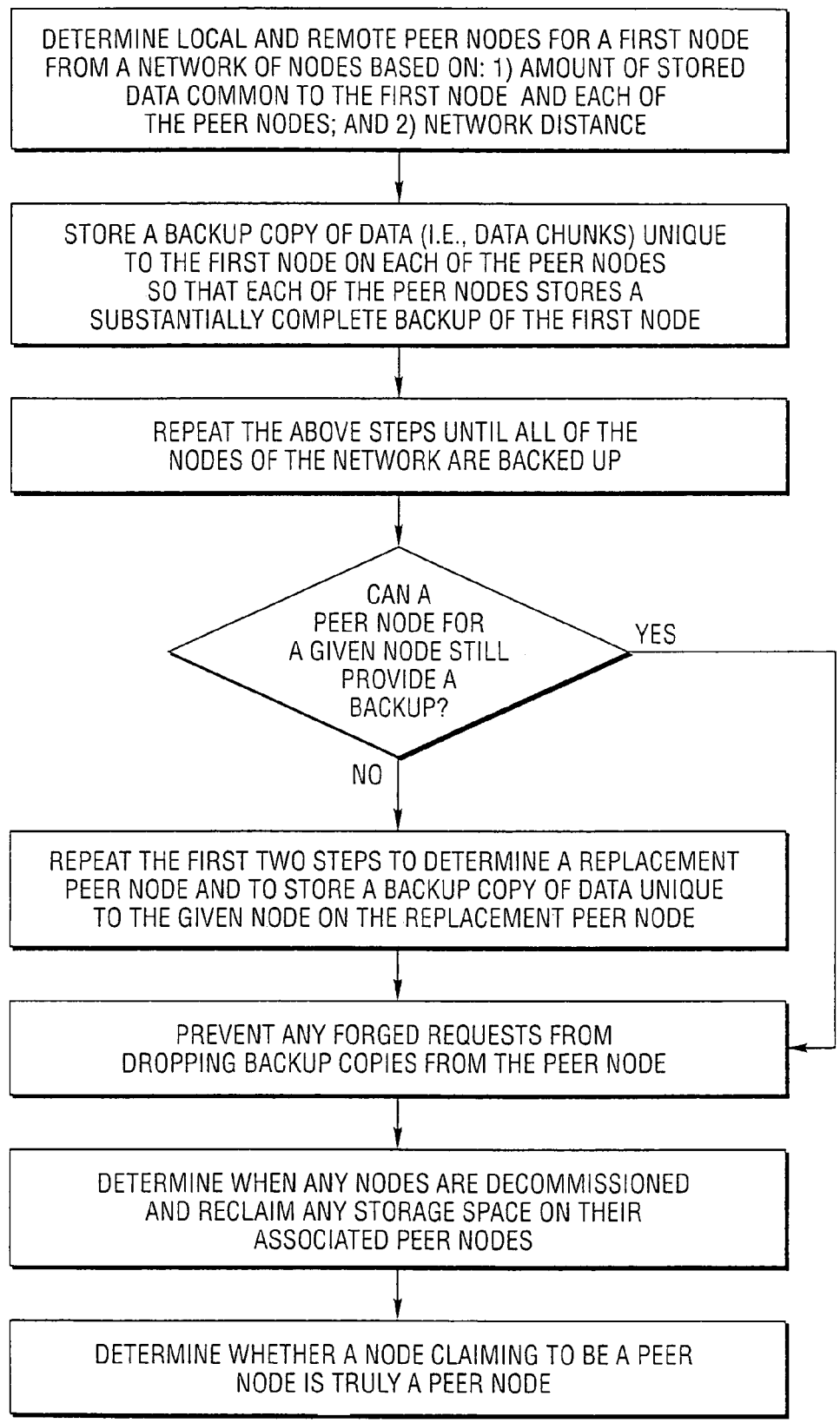
FIG. 3 is a block diagram flow chart illustrating one embodiment of the method of the present invention.

One embodiment of the method and system of the present invention which is shown in FIG. 3 in block diagram form, leverages this mechanism to detect snapshots belonging to decommissioned machines. Each buddy knows that its corresponding host does not fully trust it to store chunks. So, the buddy expects to be probed periodically. If a buddy does not hear from its corresponding host for an exceptionally long period, it can assume that the host has either been decommissioned or re-installed. This decision should be made conservatively, or a long-lived failure could be mistaken for a voluntary removal.

CONCLUSION

The method and system of the present invention enables automatic backup with no administrative costs, using only excess disk capacity among a set of cooperating peers. Since the invention matches nodes with substantial data in common, this excess capacity can be relatively modest. These peers may be selected through the use of complimentary peer-to-peer overlay networks, one organized by network distance, the other by degree of data held in common. The self-organizing nature of these overlays, combined with mechanisms to detect failed or malicious peers, provides backup without user or administrator intervention.

Evaluation of the prototype of the invention demonstrates that this service is provided without penalizing file system performance. Simulations confirm the effectiveness of node discovery, while analysis shows that detecting malicious hosts requires only modest resources. The present invention lowers the barriers to backup so that all data can be protected, not just that judged to be worthy of the expense and burden of current schemes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A peer-to-peer method for performing and managing backups in a network of nodes which form a cooperative collection of machines having excess storage capacity, the method comprising:
   (a) determining a plurality of peer nodes from the network of nodes for a first node of the network based on an amount of stored data common to both the first node and each of the plurality of peer nodes; and
   (b) storing a backup copy of data unique to the first node on each of the plurality of peer nodes so that each of the plurality of peer nodes stores a substantially complete backup of the first node.

2. The method as claimed in claim 1, further comprising repeating steps (a) and (b) for each of the other nodes of the network so that a plurality of substantially complete backups are stored on a plurality of peer nodes for each of the nodes of the network.

3. The method as claimed in claim 2, wherein data is stored in the peer nodes as chunks of encrypted data and wherein each of the encrypted chunks includes data which represents a set of nodes having an interest in the encrypted chunk.

4. The method as claimed in claim 1, wherein the step of determining is also based on network distance that each of the plurality of peer nodes is from the first node.

5. The method as claimed in claim 1, wherein at least one of the plurality of peer nodes is the local peer node to reduce network load and improve restore performance.

6. The method as claimed in claim 1, wherein at least one of the plurality of peer nodes is a remote peer node to provide geographic diversity.

7. The method as claimed in claim 1, wherein data is stored in the first and peer nodes as chunks of data.

8. The method as claimed in claim 7, wherein the data is stored in the peer nodes as encrypted chunks.

9. The method as claimed in claim 8, wherein the data is encrypted by a key derived from the data stored in the peer nodes.

10. The method as claimed in claim 9, wherein the key is encrypted.

11. The method as claimed in claim 10, wherein the key is encrypted by a key-encrypting key stored with the data.

12. The method as claimed in claim 1, further comprising monitoring the plurality of peer nodes to determine if a peer node is no longer capable of providing a backup to the first node and repeating steps (a) and (b) to determine a replacement peer node from the network of nodes and to store a backup copy of data unique to the first node on the replacement peer node.

13. The method as claimed in claim 12, wherein the step of monitoring is performed statistically.

14. The method as claimed in claim 1, further comprising preventing a forged request to drop a backup copy from one of the peer nodes.

15. The method as claimed in claim 1, further comprising determining when the first node is decommissioned and reclaiming storage space on the peer nodes associated with the decommissioned node.

16. The method as claimed in claim 1, further comprising determining whether a node of the network claiming to be a peer node is a peer node.

17. A peer-to-peer system for performing and managing backups in a network of nodes which form a cooperative collection of machines having excess storage capacity, the system comprising:
   means for determining a plurality of peer nodes from the network of nodes for a first node of the network based on an amount of stored data common to both the first node and each of the plurality of peer nodes; and
   means for storing a backup copy of data unique to the first node on each of the plurality of peer nodes so that each of the plurality of peer nodes stores a substantially complete backup of the first node.

18. The system as claimed in claim 17, wherein the means for determining determines a plurality of peer nodes from the network for each of the nodes of the network and wherein the means for storing stores a backup copy of data unique to each of the nodes of the network on each of its plurality of peer nodes so that a plurality of substantially complete backups are stored on a plurality of peer nodes for each of the nodes of the network.

19. The system as claimed in claim 18, wherein data is stored in the peer nodes as chunks of encrypted data and wherein each of the encrypted chunks includes data which represents a set of nodes having an interest in the encrypted chunk.

20. The system as claimed in claim 17, wherein the means for determining determines the plurality of peer nodes based on network distance that each of the plurality of peer nodes is from the first node.

21. The system as claimed in claim 17, wherein at least one of the plurality of peer nodes is the local peer node to reduce network load and improve restore performance.

22. The system as claimed in claim 17, wherein at least one of the plurality of peer nodes is a remote peer node to provide geographic diversity.

23. The system as claimed in claim 17, wherein data is stored in the first and peer nodes as chunks of data.

24. The system as claimed in claim 23, wherein the data is stored in the peer nodes as encrypted chunks.

25. The system as claimed in claim 24, wherein the data is encrypted by a key derived from the data stored in the peer nodes.

26. The system as claimed in claim 25, wherein the key is encrypted.

27. The system as claimed in claim 26, wherein the key is encrypted by a key-encrypting key stored with the data.

28. The system as claimed in claim 17, further comprising means for monitoring the plurality of peer nodes to determine if a peer node is no longer capable of providing a backup to the first node, wherein the means for determining determines a replacement peer node from the network of nodes and wherein the means for storing stores a backup copy of data unique to the first node on the replacement peer node.

29. The system as claimed in claim 28, wherein the means for monitoring monitors the plurality of peer nodes statistically.

30. The system as claimed in claim 17, further comprising means for preventing a forged request to drop a backup copy from one of the peer nodes.

31. The system as claimed in claim 17, further comprising means for determining when the first node is decommissioned and means for reclaiming storage space on the peer nodes associated with the decommissioned node.

32. The system as claimed in claim 17, further comprising means for determining whether a node of the network claiming to be a peer node is a peer node.

* * * * *